(12) United States Patent
Mäkeläinen (10) Patent No.: US 10,126,489 B2
(45) Date of Patent: Nov. 13, 2018

(54) LIQUID CRYSTAL DISPLAY MODULE

(71) Applicant: Microsoft Technology Licensing, LLC, Redmond, WA (US)

(72) Inventor: Esa Juhani Mäkeläinen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/232,640

(22) Filed: Aug. 9, 2016

(65) Prior Publication Data

US 2018/0045879 A1 Feb. 15, 2018

(51) Int. Cl.
G02F 1/1335 (2006.01)
F21V 8/00 (2006.01)

(52) U.S. Cl.
CPC ......... G02B 6/0088 (2013.01); G02B 6/0051 (2013.01); G02B 6/0055 (2013.01); G02B 6/0065 (2013.01)

(58) Field of Classification Search
CPC ............ G02F 1/133615; G02B 6/0068; G02B 6/0088; G02B 6/0051; G02B 6/0055; G02B 6/0065
USPC .......................................................... 349/65
See application file for complete search history.

(56) References Cited

U.S. PATENT DOCUMENTS

| | | | |
|---|---|---|---|
| 6,053,619 A | 4/2000 | Nakamura et al. | |
| 8,462,291 B2 * | 6/2013 | Chen ................. | G02F 1/133608 349/58 |
| 9,053,648 B1 | 6/2015 | Lee et al. | |
| 9,121,983 B1 | 9/2015 | Cantos | |
| 9,297,948 B1 | 3/2016 | Zhou | |
| 2005/0280751 A1 | 12/2005 | Kim et al. | |
| 2010/0014015 A1 * | 1/2010 | Ho .................... | G02F 1/133605 349/58 |
| 2013/0038809 A1 | 2/2013 | Hung et al. | |
| 2014/0118661 A1 | 5/2014 | Qi et al. | |
| 2015/0016091 A1 | 1/2015 | Chang et al. | |

(Continued)

FOREIGN PATENT DOCUMENTS

| CN | 102734707 B | 2/2015 |
|---|---|---|
| CN | 103093700 B | 3/2015 |

(Continued)

OTHER PUBLICATIONS

"International Search Report and Written Opinion Issued in PCT Application No. PCT/US2017/045002", dated Nov. 8, 2017, 12 Pages.

(Continued)

Primary Examiner — Nathanael R Briggs
Assistant Examiner — William Peterson

(57) ABSTRACT

An LCD module comprises an LCD panel and a backlight unit. The LCD panel has a front face and N sides (where N>2). The backlight unit comprises a frame, a light guide and a reflector. The frame has a front face, a rear face, N sides and a central aperture and the LCD panel is attached to the front face of the frame such that a first of the N sides of the frame is flush with a first of the N sides of the LCD panel. The light guide is positioned within the central aperture of the frame. The reflector covers the rear face of the light guide and some or all of the rear face of the frame and is attached to at least a part of the first side of the frame and to at least a part of the first side of the LCD panel.

20 Claims, 6 Drawing Sheets

(56) References Cited

U.S. PATENT DOCUMENTS

2015/0049285 A1    2/2015   Qian et al.
2017/0045671 A1    2/2017   Zeng et al.

FOREIGN PATENT DOCUMENTS

| CN | 204285132 U | 4/2015 |
| CN | 104763931 A | 7/2015 |
| CN | 102913818 B | 8/2015 |
| WO | 2008023900 A1 | 2/2008 |

OTHER PUBLICATIONS

Xu, Zerry, "LCD backlight in Light", Published on: Dec. 30, 2010, 4 pages Available at: http://light.ezinemark.com/lcd-backlight-1722432108f.html.

\* cited by examiner

LIQUID CRYSTAL DISPLAY MODULE

BACKGROUND

Liquid crystal displays (LCDs) are used in a large number of consumer devices. Such displays typically comprise an LCD module and some electronics (e.g. a power supply, power buttons, etc.). The LCD module comprises an LCD panel (which includes one or more layers of LC material) and a backlight unit (because the LCD panel does not produce any illumination). The LCD module may be protected by a layer of strong glass/plastic which provides the display face of the device. The active area (i.e. the area which can be used to display information) of the LCD module does not extend right to the edges of the module and instead there is a small border around the active area, referred to as the 'deadband', which cannot be used to display anything (and typically looks black to a user). One reason for the deadband is that the backlight unit is larger (e.g. wider and longer) than the LCD panel.

For smaller displays, the size of the deadband (or non-display portion) of an LCD module is more significant, particularly as for some applications there is a desire to extend the display area as close as possible to the edges of a device (e.g. in a smaller form factor device such as a tablet computer, a mobile phone or smart watch). For a 5-6 inch LCD module (where this dimension is the length of the diagonal across the display), the deadband may be a border around the active part of the display which is around one millimeter wide.

The embodiments described below are not limited to implementations which solve any or all of the disadvantages of known LCD modules and LCD displays.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An LCD module comprises an LCD panel and a backlight unit. The LCD panel has a front face and N sides (where N>2). The backlight unit comprises a frame, a light guide and a reflector. The frame has a front face, a rear face, N sides and a central aperture and the LCD panel is attached to the front face of the frame such that a first of the N sides of the frame is flush with a first of the N sides of the LCD panel. The light guide is positioned within the central aperture of the frame. The reflector covers the rear face of the light guide and some or all of the rear face of the frame and is attached to at least a part of the first side of the frame and to at least a part of the first side of the LCD panel.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used where appropriate to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
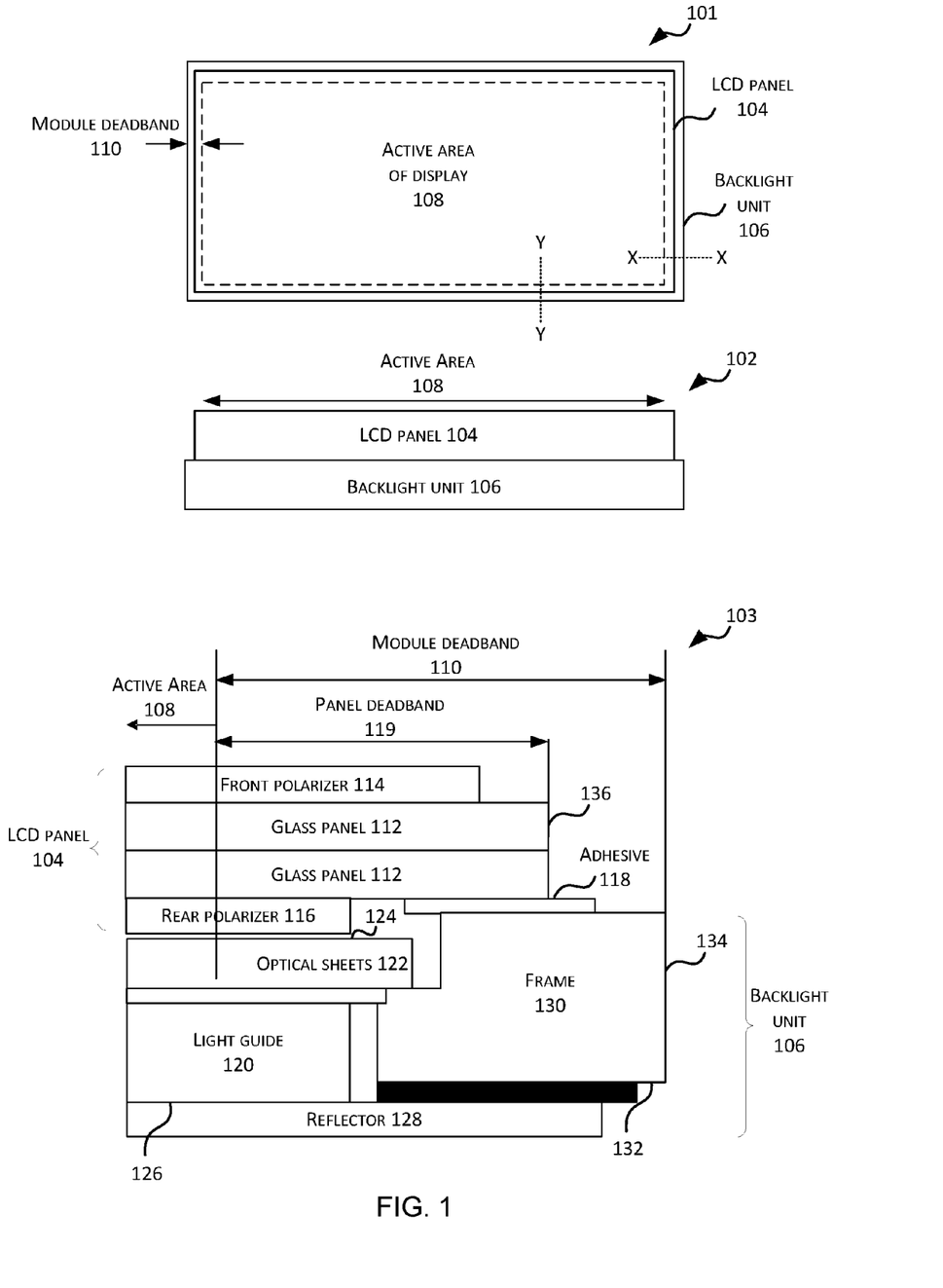
FIG. 1 shows three schematic diagrams of an LCD module.

In many applications there is a desire to extend the display area as close as possible to the edges of an LCD module by reducing the width of the deadband, which may, for example, be around one millimeter wide for a 5-6 inch LCD module. Part of this deadband is a consequence of the outer dimensions of the backlight unit being larger than the outer dimensions of the LCD panel, as shown in FIG. 1. Another contributor to this difference on one side of the LCD module is, in some implementations, the panel driver IC which may be attached to the bottom glass layer within an LCD panel (e.g. using chip-on-glass technology) on one side and hence increases the deadband on that side. In other implementations, chip-on-flex may be used instead of chip-on-glass and in such implementations, one side has a larger deadband because the flex is bonded to the glass panel edge area on one side of the LCD panel.

FIG. 1 shows three schematic diagrams of an LCD module. The first diagram 101 shows a front view of the LCD module, the second diagram 102 shows a side view and the third diagram 103 shows a cross-section through one edge of the LCD module (e.g. along line X-X or Y-Y shown in the first diagram 101). The LCD module comprises an LCD panel 104 and a backlight unit 106 and as described above, the outer dimensions of the backlight unit 106 are larger than the outer dimensions of the LCD panel 104. The active area of the display 108 is smaller than both the LCD panel 104 and the backlight unit 106 and the non-display portion which surrounds the active area of the display 108 is referred to as the module deadband 110.

The cross-section shown in the third diagram 103 shows the LCD panel 104 and the backlight unit 106 in more detail; however, to increase clarity there maybe additional parts of the LCD panel and/or backlight unit which are not shown in FIG. 1. The LCD panel 104 comprises top and bottom glass panels 112 sandwiched between two polarizers 114, 116 and with a liquid crystal layer (not shown in FIG. 1) between the two glass panels 112 and the LCD panel 104 is attached to the backlight unit 106 using adhesive 118. The deadband 119 of the LCD panel 104 extends from the edge of the active area 108 to the edge of the glass panels 112 and, as shown in FIG. 1, is smaller than the deadband 110 of the overall LCD module.

The backlight unit 106 comprises a light guide 120 and a stack of optical sheets (or layers) 122 which may for example include, a diffuser sheet (or layer), a prism sheet (or layer), etc. The light guide 120 and optical sheets 122 form a stack of optical elements within the backlight unit 106 with a front face 124 proximate to the LCD panel 104 and a rear face 126 covered by a reflector element 128 which is reflective at least on the part of the face adjacent to the light guide 120. A frame (or support) 130 surrounds the stack of optical elements 120, 122 in the backlight unit 106 and the LCD panel 104 is attached to an upper surface of the frame 130. The reflector 128 extends beyond the edges of the light guide 120 and is attached to a rear face 132 of the frame 130. As shown in FIG. 1, the frame 130 extends beyond the edge of the LCD panel 104 such that outer edge 134 of the frame 130 is not aligned with the outer edge 136 of the LCD panel 104. The deadband 110 of the LCD module therefore extends from the edge of the active area 108 to the outer edge 134 of the frame 130.

The width of the module deadband 110 may be reduced so that it is more closely aligned with the panel deadband 119 by reducing the width of the frame 130; however this impacts the robustness of the LCD module (e.g. because the contact area, and hence the area of adhesive, between the LCD panel 104 and the backlight unit 106 is reduced) and this may result in failure of the LCD module during manufacture and/or in use (e.g. if a device containing the LCD module is flexed or dropped). Additionally, optical distortions around the edge of the LCD module may be increased (e.g. as a consequence of increased light leakage from the backlight unit).

Described herein is an improved LCD module in which the difference between the panel deadband and module deadband is reduced on at least one side and in various examples on all sides of the LCD module. In the LCD module described herein, the module deadband on at least one side of the LCD module is only slightly larger than the panel deadband. To maintain the robustness of the LCD module, the reflector extends from the back face of the backlight unit, around the corner of the frame in the backlight unit and is attached to at least a part of the side face of the LCD panel on the side (or sides) having the reduced module deadband. To reduce the possibility of light leakage from the backlight unit around the sides of the LCD panel, an optically non-reflective (e.g. black) adhesive material may be used to attach the extended portion of the reflector to the side face of the LCD panel.

Using the techniques described herein, the module deadband can be reduced and closely aligned with the panel deadband on at least one side of an LCD module without significantly reducing the robustness of the LCD module and without increasing the optical distortions around the edge of the LCD panel. Furthermore, no additional components are required and so the complexity and length of the manufacturing process is not significantly increased.

Figure 2:
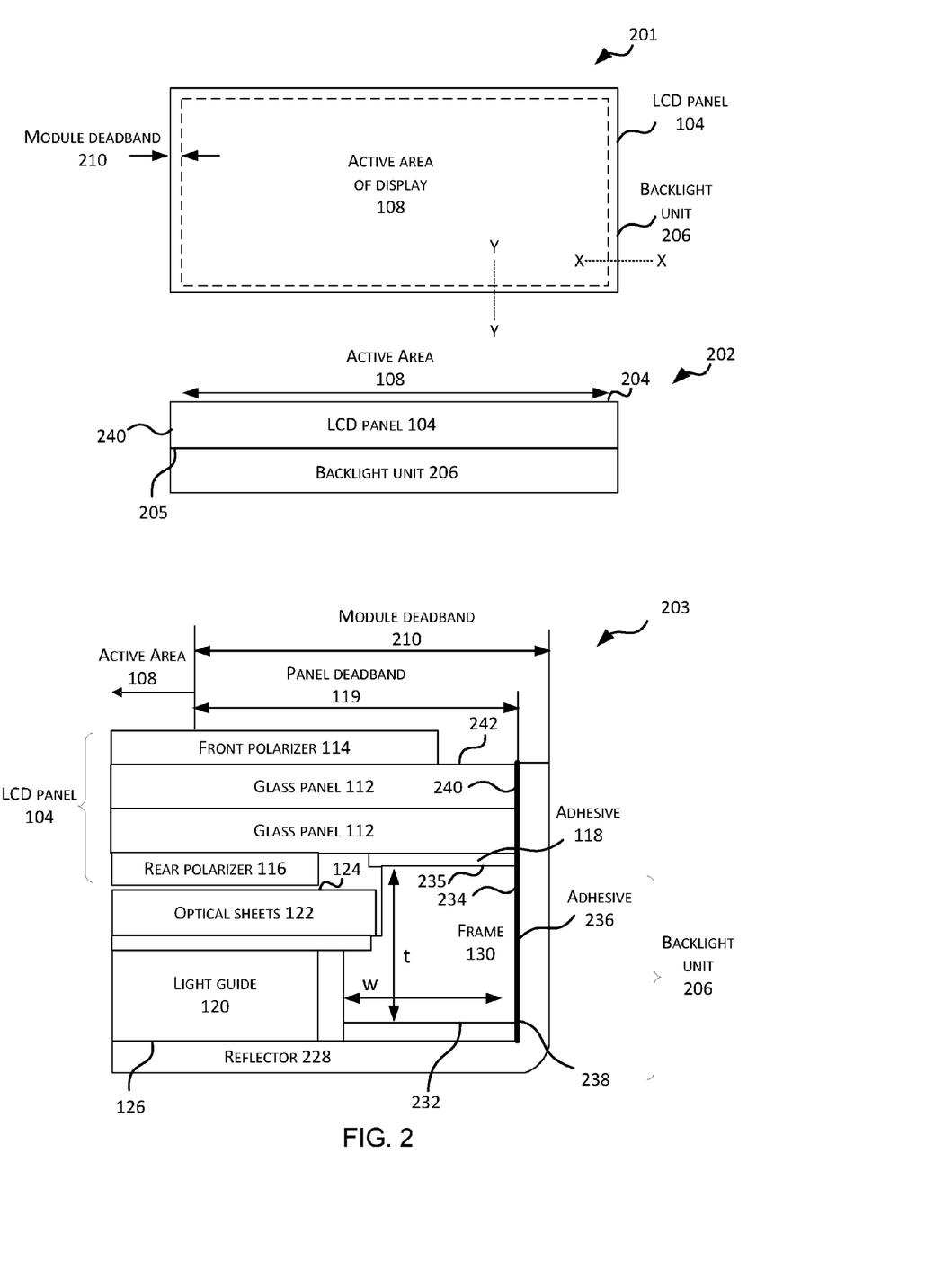
FIG. 2 shows three schematic diagrams of an example improved LCD module.

FIG. 2 shows three schematic diagrams of an improved LCD module.

The first diagram 201 shows a front view of the improved LCD module, the second diagram 202 shows a side view and the third diagram 203 shows a cross-section through one edge of the improved LCD module (e.g. along line X-X or Y-Y shown in the first diagram 201). The improved LCD module comprises an LCD panel 104 (which is the same as that described above with reference to FIG. 1 and comprises a front face 204, a rear face 205 and N sides 240, where in this example, N=4 and more generally N is an integer greater than two) and a backlight unit 206. In this example, the reduction in module deadband has been implemented on all four sides of the LCD module; however, as described above in other examples, the reduction may be used on fewer sides (e.g. one side or two opposite sides, e.g. left and right sides, or on three sides, e.g. left, right and opposite to the driver IC side) and on sides where the reduction is not used, the cross-section may remain as described above with reference to FIG. 1.

In the improved LCD module shown in FIG. 2, the outer dimensions of the backlight unit 206 are only slightly larger than the outer dimensions of the LCD panel 104, with the difference corresponding to the thickness of the reflector 228 and the adhesive 236.

The cross-section shown in the third diagram 203 shows the LCD panel 104 and the backlight unit 206 in more detail; however, to increase clarity there maybe additional parts of the LCD panel and/or backlight unit which are not shown in FIG. 2. The backlight unit 206 comprises a light guide 120 and a stack of optical sheets (or layers) 122. As described above with reference to FIG. 1, the light guide 120 and optical sheets 122 form a stack of optical elements within the backlight unit 206 with a front face 124 proximate to the LCD panel 104 and a rear face 126 covered by a reflector element 228 which is reflective at least on the part of the face adjacent to the light guide 120. A frame (or support) 230 comprises a front face 235, a rear face 232, N sides 234 and a central aperture to receive the stack of optical elements 120, 122 in the backlight unit 206, such that the frame surrounds (and protects) the stack of optical elements 120, 122 (as shown in the second cross-section 302 in FIG. 3). The LCD panel 104 is attached to an upper (or front) surface 235 of the frame 230 and the outside edge 234 of the frame 230 is flush with (i.e. is aligned or level with) an edge 240 of the LCD panel 104.

Compared to the frame 130 shown in FIG. 1, the frame 230 in the improved LCD module shown in FIG. 2 has the same (or a similar) thickness, t (i.e. in a plane perpendicular to the display), but a reduced width, w (i.e. in a plane parallel to the display). The reflector 228 extends beyond the edges of the light guide 120, around a corner 238 of the frame 230 and is attached to the rear face 232 of the frame 230, the side face 234 of the frame 230 and at least a part of the side face 240 of the LCD panel 104.

Any suitable adhesive 236 may be used to attach the extended portion of the reflector 228 to the side faces 234, 240 of the frame 230 and LCD panel 104 and in various examples, a double-sided adhesive may be used. In other examples, a liquid adhesive (e.g. a liquid glue which is cured using heat or UV) may be used instead and may provide a thinner layer, thereby reducing further the difference between the panel deadband 119 and the module deadband 210. The adhesive 236 may be selected to provide a suitable strength (to satisfy a robustness specification) whilst minimizing its thickness and in various examples, the adhesive may also be selected depending upon the manufacturing process used to assembly the improved LCD module. As described above, in various examples, the adhesive may be optically non-reflective (e.g. black).

In the example shown in FIG. 2, the reflector 228 does not extend all the way up the side 240 of the LCD panel 104 but instead extends partially up the side 240 of the LCD panel 104 (e.g. stopping approximately level with a front face 242 of the top glass panel 112). In other examples, however, the reflector 228 may extend all the way up the side of the LCD panel 304 so that the top edge 343 of the reflector is flush with a front surface 344 of the front polarizer 314 as shown in the first further example cross-section 301 in FIG. 3.

Figure 3:
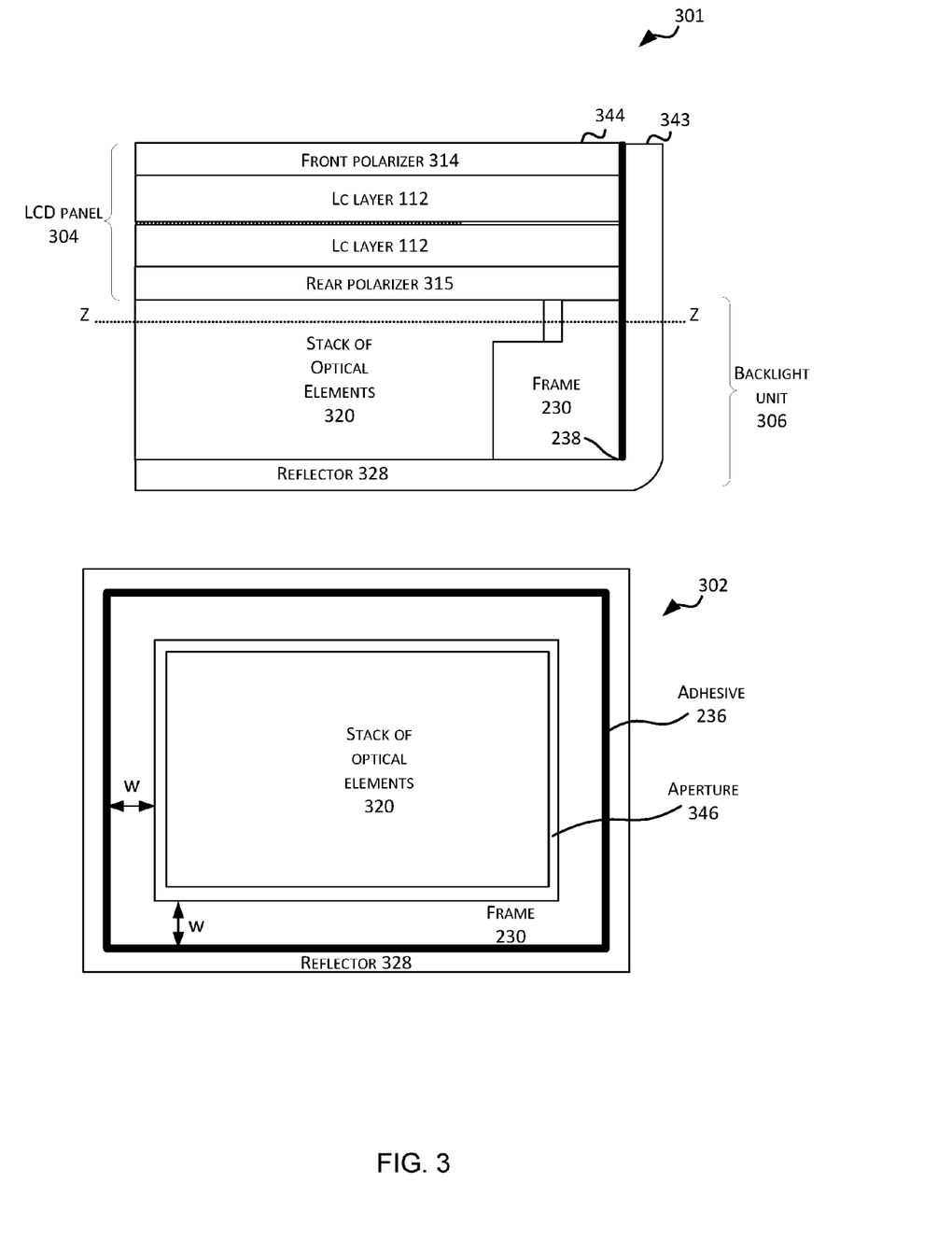
FIG. 3 shows two schematic diagrams of further example improved LCD modules.

Although the first cross-section 301 in FIG. 3 shows both of the polarizers 314, 316 extended to cover the entire faces of the glass panels 112, unlike in the example shown in FIG. 2 (where the polarizers 114, 116 do not extend to the edges of the glass panels 112), in a further example (which combines features from both FIG. 2 and FIG. 3), the front polarizer 314 may extend to cover the entire front face of the upper glass panel 112 (as in the example shown in FIG. 3) and the rear polarizer may be smaller and not extend to cover the entire rear face of the lower glass panel 112 (as in the example shown in FIG. 2). Irrespective of the structure of the LCD panel, the reflector may extend partially up the side of the LCD panel (e.g. as shown in FIG. 2) or all the way up the side of the LCD panel (e.g. as shown in the first cross-section 301 in FIG. 3).

FIG. 3 also shows a second cross-section 302 which is a cross-section along the line Z-Z in the first cross-section 301, i.e. it is a cross-section through the backlight unit along a plane which is parallel to the display. As shown in the second cross-section 302 in FIG. 3, the frame 230 comprises a central aperture 346 in which the stack of optical elements 320 (e.g. the light guide 120 and optical sheets 122) are located. Around the outside edges of the frame is a layer of adhesive 236 which attaches the extended portions of the reflector 328 to the outside edges of the frame.

Figure 4:
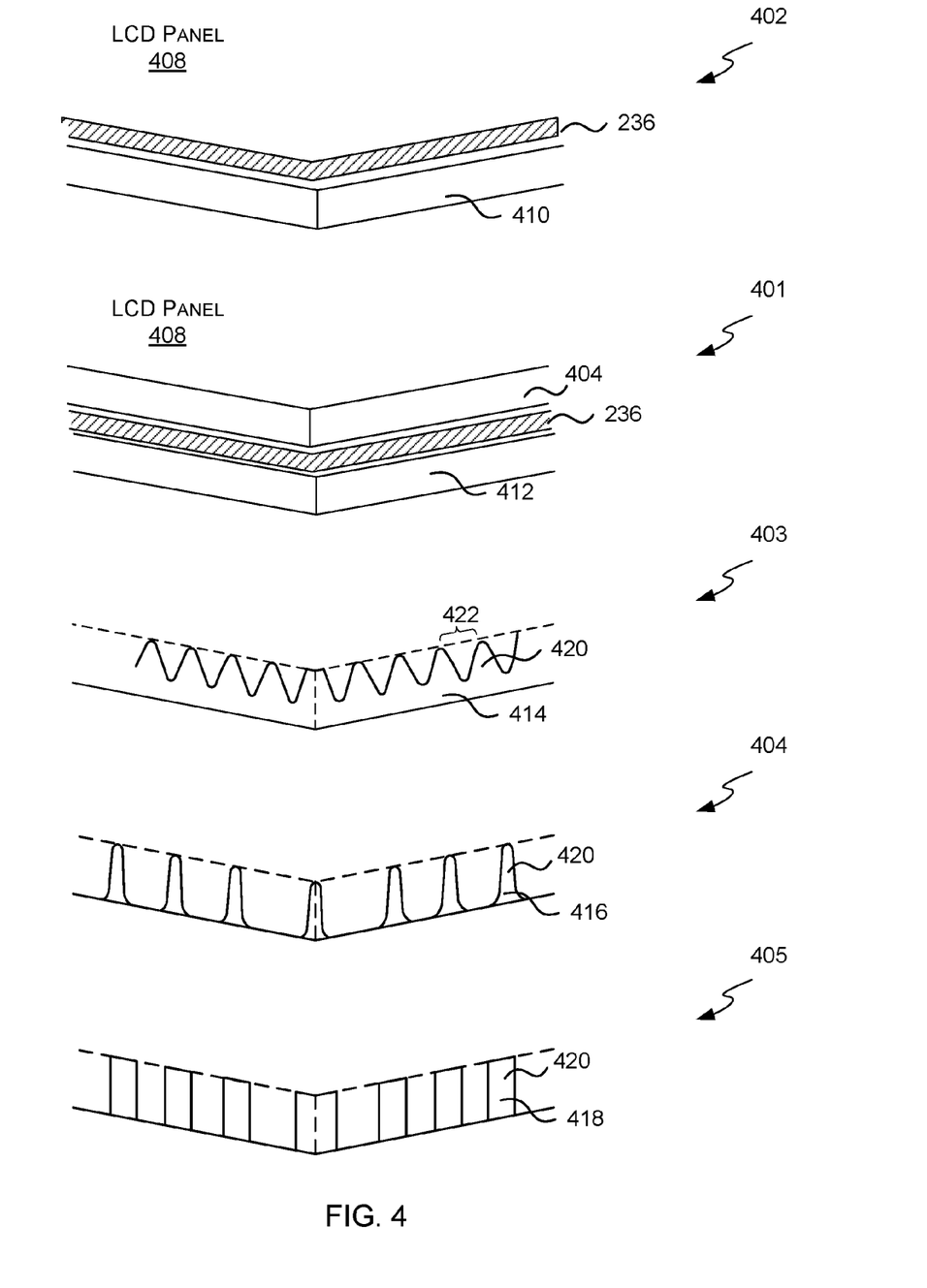
FIG. 4 shows five perspective views of the reflector in an improved LCD module such as shown in any of FIGS. 2, 3 and 5.

In the examples shown in FIGS. 2 and 3, the reflector 228 may extend up the side of the LCD panel 104, 304 along an entire side of the LCD module or the amount of extension of the reflector 228 may vary along a side of the LCD module, as can be explained with reference to the schematic diagrams shown in FIG. 4. FIG. 4 shows five perspective views 401-405 of the reflector in an improved LCD module as described herein. In the first example 401 in FIG. 4 the reflector 410 extends partially up the side of the LCD panel 408 along the entire face and in the second example 402 in FIG. 4 the reflector 412 extends all the way up the side of the LCD panel 408 along the entire face. In contrast, in the latter three examples, the reflector 414-418 does not extend by the same amount across an entire face and in the examples shown, the reflector has fingers (or tabs) 420 which extend at least partially (and in some examples, all the way) up the side of the LCD panel. In the third example 403, the fingers 420 are separated by regions 422 which extend less far up the side of the backlight unit and the LCD panel and, in various examples may not extend onto the side of the LCD panel at all (i.e. they may extend partially or fully up the side of the frame of the backlight unit but stop before the top of the frame). In the fourth and fifth examples 404-405, only the fingers 420 of the reflector 416-418 extend up the side of the backlight unit and at least partially up the side of the LCD panel. As shown in the latter three examples 403-405 in FIG. 4, the fingers 420 may have any shape and may, for example, have rounded ends (as in examples 403-404) or square ends (as in example 405). Use of fingers (or tabs) 420 as in the latter three examples 403-405, may result in a reflector which is easier to form (e.g. after the backlight unit has been attached to the LCD panel).

Figure 5:
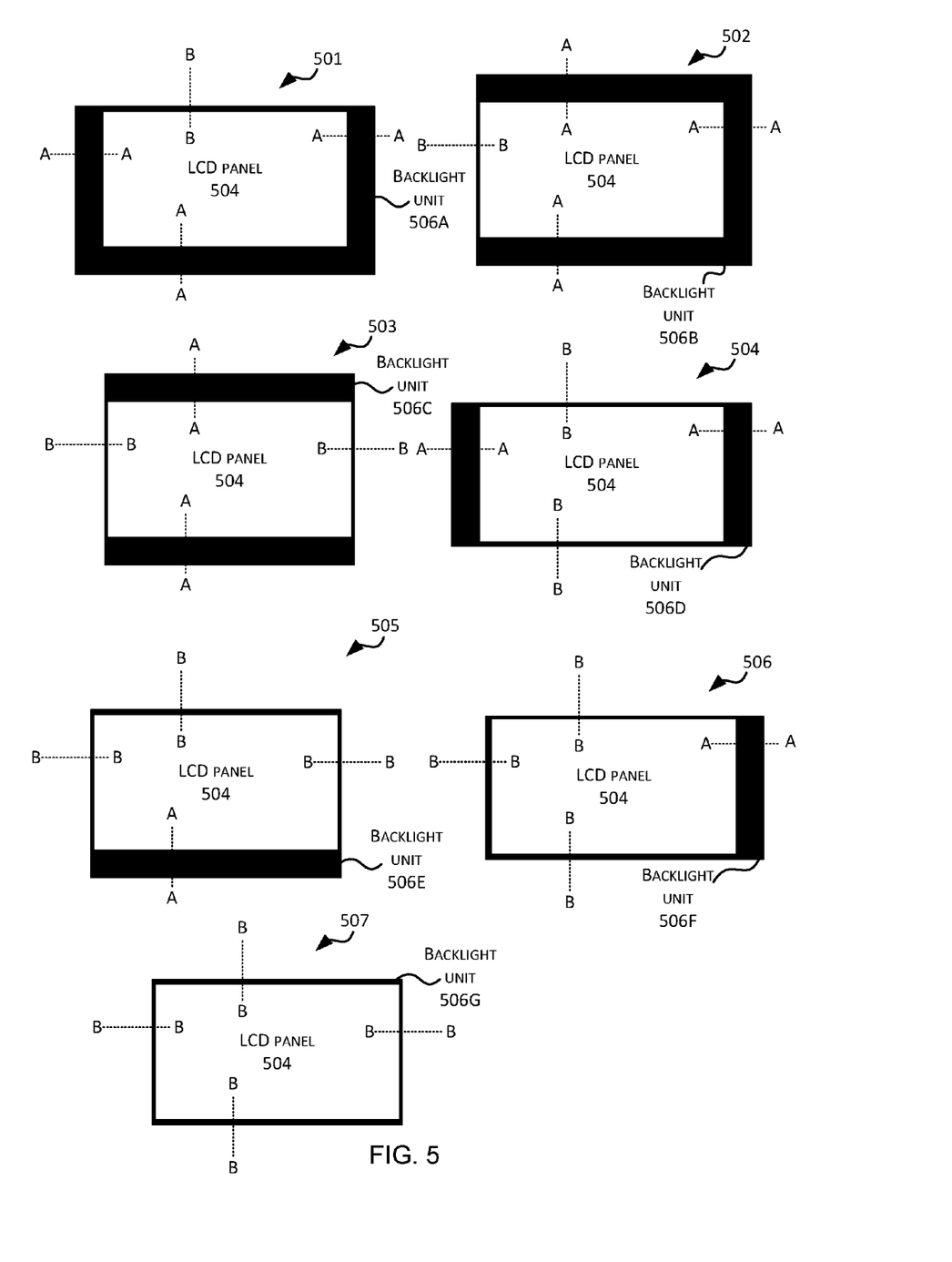
FIG. 5 shows seven schematic diagrams of further example improved LCD modules.

As described above, the reduction in the width of the frame of the backlight and the extension to the reflector around the side of the LCD module such that it is attached to at least a part of a side of the LCD panel can be implemented on one or more sides of an LCD module and seven different examples are shown in FIG. 5 for a rectangular LCD module comprising an LCD panel 504 and a backlight unit 506A-G. Although the LCD module is shown as rectangular (and hence has four sides), the techniques described herein may be implemented on a display with any number of sides (e.g. 3 sides, 5 sides, 6 sides, 8 sides, etc.) and any shape.

In the first two examples 501-502 in FIG. 5, the width of the frame is reduced and the reflector extended on one side only, such that the cross-section along lines A-A are as shown in FIG. 1 and the cross-section along lines B-B may be as shown in FIG. 2 or 3 or the variants thereof described above. In the second two examples 503-504, the width of the frame is reduced and the reflector extended on two opposite sides, such that the cross-section along lines A-A are as shown in FIG. 1 and the cross-section along lines B-B may be as shown in FIG. 2 or 3 or the variants thereof described above. Although these two examples 503-504 show the reduction in deadband being implemented on two opposite sides, in other examples, it may be implemented on two adjacent sides of an LCD module. In the next two examples, 505-506, the width of the frame is reduced and the reflector extended on three of the four sides, such that the cross-section along lines A-A are as shown in FIG. 1 and the cross-section along lines B-B may be as shown in FIG. 2 or 3 or the variants thereof described above. In the final example, 507, the width of the frame is reduced and the reflector extended on all four sides, such that the cross-section along lines B-B may be as shown in FIG. 2 or 3 or the variants thereof described above.

The reflector in the improved LCD module described herein may be formed from any suitable material which is reflective over at least the portion of the surface of the reflector which is adjacent to the light guide 120 (which is part of the stack of optical elements 320 shown in FIG. 3). Furthermore the reflector may be pre-formed in its curved shape (i.e. with the portion that extends around the corner so that it can be attached to at least a part of the side of an LCD panel) or may be formed (e.g. bent) into position after the LCD panel has been attached to the backlight unit and these options are shown in FIG. 6.

Figure 6:
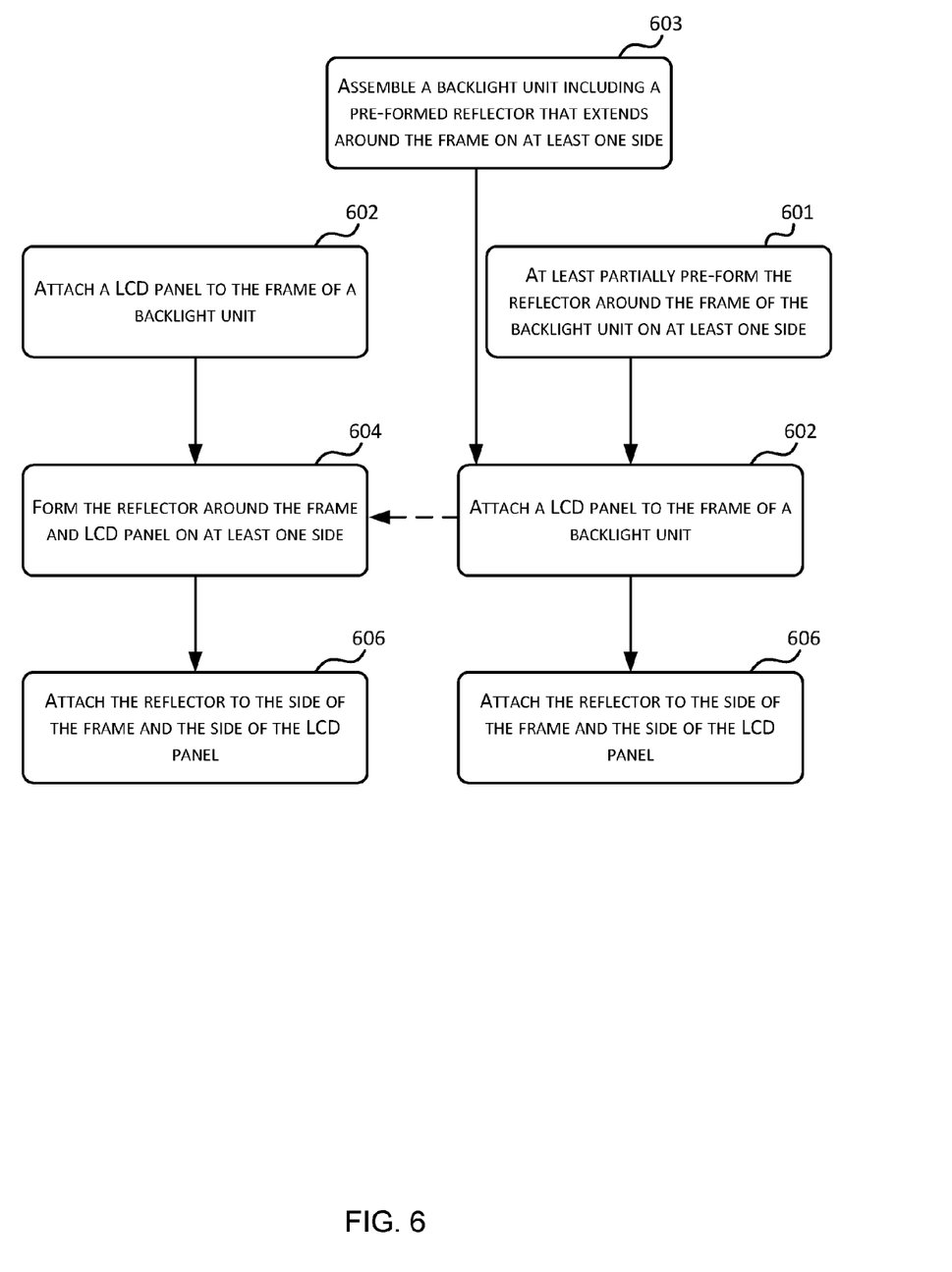
FIG. 6 comprises flow diagrams showing example methods of manufacture of an improved LCD module such as shown in any of FIGS. 2, 3 and 5.

FIG. 6 comprises flow diagrams showing example methods of manufacture of an improved LCD module as described herein. In a first example method, the LCD panel is attached to the frame of a backlight unit (block 602) before the reflector, which extends beyond the frame on at least one side, is formed around the frame and the LCD panel on the sides where it extends (block 604). As part of the forming process (in block 604) or subsequently, the reflector is attached to the side of the frame and the side of the LCD panel (block 606). In a second example method, the reflector is pre-formed (block 601) before the LCD panel is attached to the backlight unit (block 602) and then as part of the attachment process (in block 602) or a separate attachment step, the reflector is attached to the side of the frame and the side of the LCD panel (block 606). In a third example method, the reflector is only partially pre-formed (block 601) before the LCD panel is attached to the backlight unit (block 602). The reflector is then further formed around the frame and the LCD panel on the sides where it extends beyond the frame (block 604). As part of the further forming process (in block 604) or subsequently, the reflector is attached to the side of the frame and the side of the LCD panel (block 606). In a further example method, the reflector may be pre-formed (e.g. formed using molding) prior to assembly into the rest of the backlight unit (block 603). The LCD panel is then attached to the backlight unit (block 602) and then as part of the attachment process (in block 602) or a separate attachment step, the reflector is attached to the side of the frame and the side of the LCD panel (block 606).

By pre-forming the reflector (in block 601), it may be possible to obtain a tighter radius of curvature at the bend of the reflector (e.g. where it goes around the corner 238 of the frame 230). A smaller radius of curvature increases the effective adhesive area, reduces the separation between the reflector and frame at this point and hence reduces the thickness of adhesive required and improves robustness of the assembled structure.

The wrapping of the reflector around the side of the LCD panel as described above, provides mechanical support for the entire LCD module. As described above, this compensates for the reduced width of the frame and enables the reduction of the module deadband without significantly reducing the robustness of the LCD module. As described above, the adhesive used to attach the reflector to the side of the frame and LCD panel may be optically non-reflective (e.g. black) to minimize leakage of light from the backlight unit around the edges of the LCD panel and hence minimize optical distortions which may be visible to a viewer of the LCD module.

The techniques described herein extend the functionality of the reflector within a backlight unit without requiring any additional components.

Although the present examples are described and illustrated herein as being implemented in a rectangular LCD module, the system described is provided as an example and not a limitation. As those skilled in the art will appreciate, the present examples are suitable for application in a variety of LCD modules of different shapes and/or sizes.

The LCD modules described herein may be incorporated into any larger device which requires a display. Examples include, but are not limited to computing devices (e.g. smartphones, tablet computers, smart watches, etc.) and other consumer devices (e.g. kitchen appliances, etc.).

A first further example provides an LCD module comprising: an LCD panel having a front face, a rear face and N sides, where N is an integer greater than two; and a backlight unit comprising: a frame having a front face, a rear face, N sides and a central aperture and wherein the LCD panel is attached to the front face of the frame such that a first of the N sides of the frame is flush with a first of the N sides of the LCD panel; a light guide positioned within the central aperture of the frame and having a front face, a rear face and a plurality of sides; and a reflector covering the rear face of the light guide and covering at least a part of the rear face of the frame and attached to at least a part of the first side of the frame and to at least a part of the first side of the LCD panel.

The LCD module may further comprise an adhesive layer between the reflector and the at least a part of the first side of the frame and between the reflector and the at least a part of the first side of the LCD panel. The adhesive layer may be formed from an optically non-reflective adhesive. The adhesive layer may be a double-sided adhesive.

Alternatively or in addition to any of the preceding examples the reflector may cover the entire first side of the frame. The reflector may additionally cover the entire first side of the LCD panel. A top edge of the reflector may be flush with the front face of the LCD panel.

Alternatively or in addition to any of the preceding examples the reflector may comprise a first portion covering the rear face of the light guide and the at least a part of the rear face of the frame and further comprising a first plurality of tabs connected to the first portion, wherein each of the first plurality of tabs is attached to a different part of the first side of the frame and to a different part of the first side of the LCD panel.

Alternatively or in addition to any of the preceding examples the LCD panel may be attached to the front face of the frame such that a second of the N sides of the frame is flush with a second of the N sides of the LCD panel and wherein the reflector further comprises a second plurality of tabs connected to the first portion, wherein each of the second plurality of tabs is attached to a different part of the second side of the frame and to a different part of the second side of the LCD panel.

Alternatively or in addition to any of the preceding examples the LCD panel may be attached to the front face of the frame such that a second of the N sides of the frame is flush with a second of the N sides of the LCD panel and wherein the reflector is additionally attached to at least a part of the second side of the frame and to at least a part of the second side of the LCD panel. The first and second sides of the frame may be opposite sides of the frame and the first and second sides of the LCD panel are opposite sides of the LCD panel.

Alternatively or in addition to any of the preceding examples the LCD panel may be attached to the front face of the frame such that each of the N sides of the frame is flush with a corresponding one of the N sides of the LCD panel and wherein the reflector is additionally attached to at least a part of each of the N sides of the frame and to at least a part of each of the N sides of the LCD panel.

Alternatively or in addition to any of the preceding examples the LCD panel may be attached to the front face of the frame such that each of N−1 sides of the N sides of the frame is flush with a corresponding one of N−1 sides of the N sides of the LCD panel and wherein the reflector is additionally attached to at least a part of each of the N−1 sides of the N sides of the frame and to at least a part of each of the N−1 sides of the N sides of the LCD panel.

A second further example provides a method of manufacturing an LCD module comprising: attaching an LCD panel to a front face of a frame of a backlight unit such that a first of N sides of the frame is flush with a first of N sides of the LCD panel, the frame comprising the front face, a rear face, the N sides and a central aperture and the LCD panel comprising a front face, a rear face and the N sides, where N is an integer greater than two; and attaching a reflector of the backlight unit to at least a part of the first side of the frame and to at least a part of the first side of the LCD panel, wherein the reflector additionally covers a rear face of a light guide located in the central aperture of the frame within the backlight unit and also covers at least a part of the rear face of the frame.

The reflector may be attached by an adhesive layer. The adhesive layer may be a double-sided adhesive. The adhesive layer may be formed from an optically non-reflective adhesive.

Alternatively or in addition to any of the preceding examples the method may further comprise, prior to attaching the reflector to the at least a part of the first side of the frame and to the at least a part of the first side of the LCD panel: forming the reflector around the frame on the first side of the frame and around the LCD panel on the first side of the LCD panel.

Alternatively or in addition to any of the preceding examples the method may further comprise, prior to attaching the LCD panel to the front face of the frame of the backlight unit: at least partially pre-forming the reflector around the frame on the first side of the frame.

Alternatively or in addition to any of the preceding examples the method may further comprise, after attaching the LCD panel to the front face of the frame of the backlight unit and prior to attaching the reflector to the at least a part of the first side of the frame and to the at least a part of the first side of the LCD panel: forming the reflector around the frame on the first side of the frame and around the LCD panel on the first side of the LCD panel.

Alternatively or in addition to any of the preceding examples the method may further comprise, prior to attaching the LCD panel to the front face of the frame of the backlight unit: assembling a backlight unit including a pre-formed reflector that extends around the frame on the first side of the frame.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An LCD module comprising:
    an LCD panel having a front face, a rear face and N sides, where N is an integer greater than two; and
    a backlight unit comprising:
        a frame having a front face, a rear face, N sides and a central aperture and wherein the LCD panel is attached to the front face of the frame such that a first of the N sides of the frame is level with a first of the N sides of the LCD panel;
        a light guide positioned within the central aperture of the frame and having a front face, a rear face and a plurality of sides; and
        a reflector covering the rear face of the light guide and covering at least a part of the rear face of the frame and abuttingly attached to at least a part of the first side of the frame and to at least a part of the first side of the LCD panel.

2. The LCD module according to claim 1, further comprising an adhesive layer between the reflector and the at least a part of the first side of the frame and between the reflector and the at least a part of the first side of the LCD panel, wherein the adhesive layer is formed from an optically non-reflective adhesive.

3. The LCD module according to claim 1, wherein an outer dimension of the LCD panel is substantially the same as an outer dimension of the backlight unit.

4. The LCD module according to claim 1, wherein the reflector covers the entire first side of the frame and an outside surface of at least the part of the rear face, and is coupled to an outside surface of the first side of the frame.

5. The LCD module according to claim 4, wherein the reflector additionally covers the entire first side of the LCD panel and a top edge of the reflector is level with the front face of the LCD panel.

6. The LCD module according to claim 1, wherein the reflector comprises a first portion covering the rear face of the light guide and the at least a part of the rear face of the frame and further comprising a first plurality of tabs connected to the first portion, wherein each of the first plurality of tabs is attached to a different part of the first side of the frame and to a different part of the first side of the LCD panel.

7. The LCD module according to claim 6, wherein the LCD panel is attached to the front face of the frame such that a second of the N sides of the frame is level with a second of the N sides of the LCD panel and wherein the reflector further comprises a second plurality of tabs connected to the first portion, wherein each of the second plurality of tabs is attached to a different part of the second side of the frame and to a different part of the second side of the LCD panel.

8. The LCD module according to claim 1, wherein the LCD panel is attached to the front face of the frame such that a second of the N sides of the frame is level with a second of the N sides of the LCD panel and wherein the reflector is additionally attached to at least a part of the second side of the frame and to at least a part of the second side of the LCD panel.

9. The LCD module according to claim 8, wherein the first and second sides of the frame are opposite sides of the frame and the first and second sides of the LCD panel are opposite sides of the LCD panel.

10. The LCD module according to claim 1, wherein the LCD panel is attached to the front face of the frame such that each of the N sides of the frame is level with a corresponding one of the N sides of the LCD panel and wherein the reflector is additionally attached to at least a part of each of the N sides of the frame and to at least a part of each of the N sides of the LCD panel.

11. The LCD module according to claim 1, wherein the LCD panel is attached to the front face of the frame such that each of N−1 sides of the N sides of the frame is level with a corresponding one of N−1 sides of the N sides of the LCD panel and wherein the reflector is additionally attached to at least a part of each of the N−1 sides of the N sides of the frame and to at least a part of each of the N−1 sides of the N sides of the LCD panel.

12. A method of manufacturing an LCD module comprising:
   attaching an LCD panel to a front face of a frame of a backlight unit such that a first of N sides of the frame is level with a first of N sides of the LCD panel, the frame comprising the front face, a rear face, the N sides and a central aperture and the LCD panel comprising a front face, a rear face and the N sides, where N is an integer greater than two; and
   attaching a reflector of the backlight unit to at least a part of the first side of the frame and to at least a part of the first side of the LCD panel, wherein the reflector is abuttingly attached to at least the part of the first side and additionally covers a rear face of a light guide located in the central aperture of the frame within the backlight unit and also covers at least a part of the rear face of the frame.

13. The method according to claim 12, wherein the reflector is attached by an adhesive layer.

14. The method according to claim 13, wherein the adhesive layer is a double-sided adhesive.

15. The method according to claim 13, wherein the adhesive layer is formed from an optically non-reflective adhesive.

16. The method according to claim 12, further comprising, prior to attaching the reflector to the at least a part of the first side of the frame and to the at least a part of the first side of the LCD panel:
   forming the reflector around the frame on the first side of the frame and around the LCD panel on the first side of the LCD panel.

17. The method according to claim 12, further comprising, prior to attaching the LCD panel to the front face of the frame of the backlight unit:
   at least partially pre-forming the reflector around the frame on the first side of the frame.

18. The method according to claim 17, further comprising, after attaching the LCD panel to the front face of the frame of the backlight unit and prior to attaching the reflector to the at least a part of the first side of the frame and to the at least a part of the first side of the LCD panel:
   forming the reflector around the frame on the first side of the frame and around the LCD panel on the first side of the LCD panel.

19. The method according to claim 12, further comprising, prior to attaching the LCD panel to the front face of the frame of the backlight unit:
   assembling a backlight unit including a pre-formed reflector that extends around the frame on the first side of the frame.

20. An LCD module comprising:
   an LCD panel having a front face, a rear face and N sides, where N is an integer greater than two; and
   a backlight unit comprising:
      a frame having a front face, a rear face, N sides and a central aperture and wherein the LCD panel is attached to the front face of the frame such that a first of the N sides of the frame is level with a first of the N sides of the LCD panel, wherein an outer surface of the frame and the LCD panel are aligned and level;
      a light guide positioned within the central aperture of the frame and having a front face, a rear face and a plurality of sides; and
      a reflector covering the rear face of the light guide and covering at least a part of the rear face of the frame and attached to at least a part of the first side of the frame and to at least a part of the first side of the LCD panel,
   wherein the reflector is attached to at least the part of the first side of the frame and to at least the part of the first side of the LCD panel with no gaps therebetween.

* * * * *